United States Patent [19]

Walsh

[11] 4,259,890
[45] Apr. 7, 1981

[54] REMOVABLE ANCHOR ASSEMBLIES

[76] Inventor: James H. Walsh, 624 Main St., Longmont, Colo. 80501

[21] Appl. No.: 3,370

[22] Filed: Jan. 15, 1979

[51] Int. Cl.³ .............................................. F16B 13/04
[52] U.S. Cl. ................................................. 411/57
[58] Field of Search .................... 85/73, 74, 79, 83, 84

[56] References Cited

U.S. PATENT DOCUMENTS

| | | | |
|---|---|---|---|
| 1,000,715 | 8/1911 | Caywood | 85/83 |
| 1,816,970 | 8/1931 | Hess | 85/84 |
| 2,370,327 | 2/1945 | Rosan | 85/83 |
| 2,438,533 | 3/1948 | Booth | 85/84 |
| 2,448,351 | 8/1948 | Brush | 85/84 |
| 2,707,897 | 5/1955 | Beeson | 85/83 |
| 3,143,917 | 8/1964 | Conner | 85/83 |
| 3,606,814 | 9/1971 | MacKenzie | 85/84 |
| 3,618,135 | 11/1971 | Weller | 85/84 X |
| 3,808,938 | 5/1974 | Chromy | 85/83 |
| 4,135,432 | 1/1979 | Schalge | 85/84 |

FOREIGN PATENT DOCUMENTS

| | | | |
|---|---|---|---|
| 502703 | 5/1954 | Canada | 85/84 |
| 2424494 | 12/1975 | Fed. Rep. of Germany | 85/84 |
| 2542369 | 4/1976 | Fed. Rep. of Germany | 85/75 |
| 813561 | 3/1937 | France | 85/83 |
| 1464004 | 2/1977 | United Kingdom | 85/84 |
| 626261 | 9/1978 | U.S.S.R. | 85/84 |

*Primary Examiner*—Thomas J. Holko
*Attorney, Agent, or Firm*—Hugh H. Drake

[57] ABSTRACT

A removable anchor assembly has an elongated hollow tube including integral upper and lower portions with at least the lower portion exhibiting resilience to lateral deflection of segments of the walls thereof. The lower portion normally changes in a diameter progressively from near the junction with the upper portion, and the upper portion generally has predetermined internal and external diameters. Longitudinal slots are spaced around the lower portion, and a laterally facing ridge on the lower portion has a normal diameter related to the exterior diameter of the upper portion. A rigid plug is movable through the upper portion and has a diameter functionally the same as that of the internal tube diameter at the upper end of the lower portion. The plug is insertable within the lower portion to wedge the walls thereof outwardly and expand the ridge diameter to an enlarged amount. The plug later may be engaged so as to permit its withdrawal and consequent contraction of the ridge in an amount to enable removal of the anchor from an opening in which it has been secured. One approach at construction forms the ridge and the tapering by means of tool and die operations, another specific approach involves the use of thread rolling, and a third approach is by way of cutting or punching operations.

16 Claims, 6 Drawing Figures a.　　　　　　b.　　　　　　c.　　　　　　d.

REMOVABLE ANCHOR ASSEMBLIES

The present invention pertains to removable anchor assemblies. More particularly, it relates to an anchor which may be inserted or cast into a hole formed in a matrix, secured firmly in place therein, and yet which is capable of subsequent easy removal from the hole.

It frequently is necessary to secure structures to walls, floors or ceilings formed of various materials. Typically, a hole is drilled into the supporting substrate and an anchor then is placed into the hole and permanently set in place. The anchor usually includes a coupling means, such an an internally threaded bore, within which a suitable fastener may be engaged. When appropriately placed, the anchor can be of substantial assistance in securing machinery to the floor and thereby guard against movement by reason of machine vibration or other reason for dislodgment. In other cases, anchors are useful in fastening various equipment to sidewalls and ceilings.

While a number of suitable anchors for such purposes exist, one problem which may arise is the need for change of location of an anchor from its initial location. The desire for that change may arise either from mistake at the outset or by reason of subsequent change in or of the equipment or other apparatus being anchored. Sometimes, abandoned anchors are simply left in place without further usage. In other cases, however, it is necessary either for aesthetic, sanitary, safety or other reasons to remove the abandoned anchors. In order to effect such removal of typical anchors, it often is necessary to resort to such measures as the employment of an air hammer to chip away at its location sufficiently to permit its removal or the use of a drill in order to cut the anchor from its seated location. In either case, the anchor is destroyed and/or the substrate in which the anchor was seated is substantially defaced. Particularly when dealing with large anchors such as those which might tie down or mount heavy machinery, girders or the like, the resultant expense of removing an anchor can be substantial.

What are believed to be representative prior-art anchors are shown in the following U.S. Pat. Nos.:

1,379,210—Phillips
1,746,050—Phillips
1,996,121—Phillips
2,963,935—Shields
3,049,358—Polos
3,200,692—Catlin
3,202,035—Rosselet
3,889,570—Polos In the apparatus of each of these patents, a tapered plug or some other type of wedge is used as an insert within an expansion shell that essentially is of uniform diameter prior to expansion. Once the shell is engaged upon the tapered plug, or vice versa, the engagement of the anchor with the substrate is essentially permanent. That is, its removal requires the use of a technique such as chipping or drilling as mentioned above.

In view of the foregoing, it is a general object of the present invention to provide a new and improved anchor assembly whereby the initially-secured anchor subsequently may be easily and cleanly removed.

Another object of the present invention is to provide a new and improved anchor assembly which includes components that may be readily manufactured by the use of existing machinery and techniques.

A further object of the present invention is to provide a new and improved retrievable anchor assembly which requires, either for installation or removal, only the use of common and readily available tools.

A removable anchor assembly formed in accordance with the present invention includes an elongated hollow tube having integral upper and lower portions with at least the lower portion exhibiting resilience to lateral deflection of segments of the walls thereof. The lower portion normally changes in diameter progressively from the junction with the upper portion to the lower end of the lower portion. The upper portion has predetermined internal and external diameters. A plurality of circumferentially-spaced longitudinal slots are formed in the wall of the lower portion. A laterally-facing ridge on the external surface of the lower portion has a nominal diameter related to the exterior diameter of the upper portion. A rigid plug is of a diameter to be movable through the upper portion and which is functionally the same as the interior diameter of the lower portion at the junction, the plug being insertable within the lower portion to wedge the walls thereof outwardly and expand the diameter of the ridge to an amount greater than the predetermined external diameter. Included in the plug is coupling means for permitting engagement therewith to enable withdrawal of the plug from out of the lower portion and consequent contraction of the diameter of the ridge to an amount no greater than approximately the exterior diameter of the upper portion. Further in accordance with the invention, there are alternative manufacturing techniques for forming the removable anchor.

The features of the present invention which are believed to be patentable are set forth with particularity in the appended claims. The organization and manner of operation of the invention, together with further objects and advantages thereof, may best be understood by reference to the following description taken in conjunction with the accompanying drawings, in the several figures of which like reference numerals identify like elements, and in which:

In general, the anchors to be described are capable of insertion into a hole pre-drilled into a matrix of a material such as concrete, metal, wood, plastic or the like. The anchor is to be capable of securement within the hole while yet being capable of being later removed intact from the hole without further damage to the substrate in the process of such removal. For a better understanding of the anchor itself, it appears appropriate to begin with a description of its process of manufacture.

Figure 1:
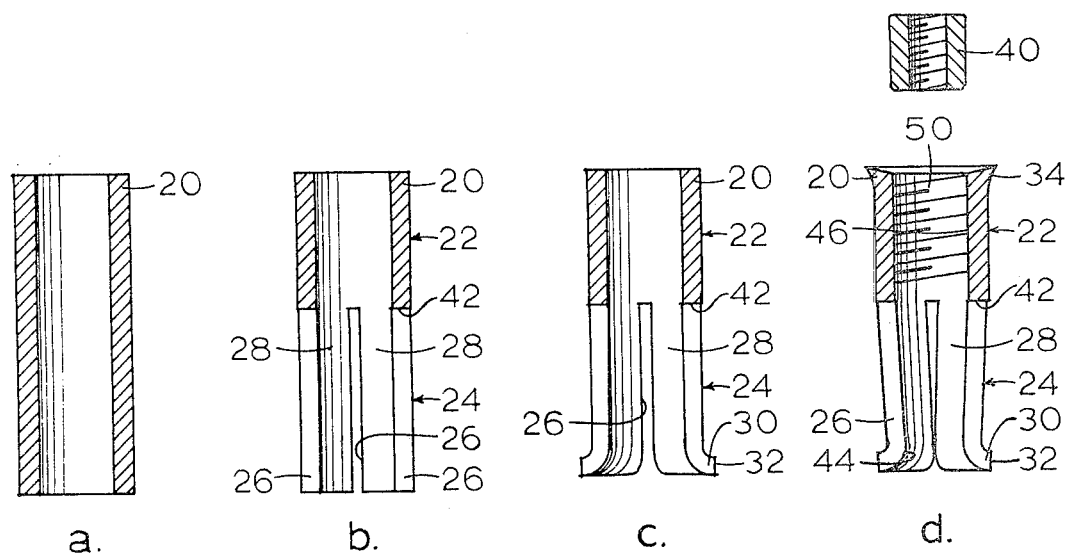
FIGS. 1a through 1d are cross-sectional views that depict successive steps involved in the formation of an anchor.

A first species of the subject matter is described with reference to FIGS. 1 and 2. As shown in FIG. 1a, an elongated hollow tube 20 is formed as by cutting a piece from an elongated length of stock. The material from which tube 20 is formed must exhibit sufficient mallability or plasticity so as to allow portions thereof to be deformed, and yet it must have or be treatable to exhibit sufficient resilience that such deformed portions will return to a normal position after being deformed. One example of such a material is a mild steel that initially is substantially mallable and yet which may later be heat treated to increase its temper sufficiently that it becomes resilient to flexure of its walls or portions thereof.

With reference to FIG. 1b, tube 20 is designated for purposes of description as having integral upper and lower portions 22 and 24 which, in this case, have at least approximately equal longitudinal dimensions. As shown in FIG. 1b, a plurality of successive circumferentially-spaced longitudinal slots 26 are cut into the wall of lower portion 24. Thus, the wall of lower portion 24 is divided into a plurality of successive and circumferentially-spaced segments 28.

Next, and referring to FIG. 1c, lower portion 24 has its segments 28 flanged sharply outwardly at the respective lower terminal portions 30 so as to define a laterally-facing ridge 32 on the external surface of lower portion 24. That may be achieved by confining tube 20 in a die from which only its bottom end portion projects and concurrently forcing that bottom end portion against an appropriate peening tool. Thereafter, lower portion 24 is swaged so that each segment 28 is caused to acquire a taper downwardly and inwardly to lower terminal portions 30 as shown in end result in FIG. 1d. In this condition, the lower end of portion 24 is effectively thicker than its upper end and ridge 32 has a normal diameter no greater than approximately the exterior diameter of upper portion 22. Preferably, the upper end portion of tube 20 is peened outwardly to form a flare 34. This may be accomplished by a tool and die operation similar to that used in forming ridge 32.

At this point in the process of manufacture, tube 20 is subjected to heat treatment, if necessary, in order that segments 28 are caused to assume a condition of resilience. That is, they are so conditioned as to reassume their relative locations as shown in FIG. 1d after having been wedged apart in a manner yet to be described.

The anchor as thus finally formed and represented in FIG. 1d is to be used by inserting it into a round hole 36 previously drilled or otherwise formed into a substrate or slab 38 in this case illustrated to be of concrete. As shown progressively in FIGS. 2a–2c, the preformed anchor is inserted within hole 36 until the outer margin of flare 34 is flush with the surface of substrate 38. Particularly when substrate 38 is of a frangible material as a result of which the upper margin of hole 36 may not be cleanly formed, flare 34 may serve to result in a neater appearance of the installed anchor site. In addition, and perhaps more important, flare 34 may serve to prevent the anchor from being driven too deeply into a hole 36 that has more depth than required.

A rigid plug 40, of hard steel or the like, then is inserted within the interior of the upper end portion 22 of tube 20. That is, plug 40 as shown in FIGS. 1d and 2c has an external diameter so as to be movable through upper portion 22 and which also is approximately the same as the interior diameter of lower portion 24 at the junction 42 between upper and lower portions 22 and 24. As a result of the swaging of segments 28, the interior wall of lower portion 24 is conditioned to a normal state in which its diameter decreases progressively from junction 42 to a constriction 44 of lower portion 24. At the same time, ridge 32 has a normal diameter which is no greater than approximately the predetermined exterior diameter of upper portion 22. Consequently, tube 20 fits easily but yet snugly within hole 36 prior to insertion of plug 40 as shown in FIG. 2c.

After initial seating of tube 20 within hole 36 as shown in FIG. 2c, plug 40 is driven downwardly within lower portion 24 and constriction 44, so as to wedge the walls thereof, composed of segments 28, outwardly and thereby expand the diameter of ridge 32 to an amount greater than the external diameter of upper portion 22 as shown in FIG. 2d. As a result, the anchor formed of tube 20 is securely seated within matrix 38, ridge 32 having been firmly expanded into the wall of hole 36. In the preferred version, plug 40 is driven downwardly by impact applied by use of a tool such as a drift punch having a diameter approximately the same as that of the inner bore 46 of upper portion 22.

Later, when it is desired for any reason to remove the anchor of tube 20 from hole 36, it is only necessary to remove plug 40 as a result of which segments 28 contract radially and in consequence of which the diameter of ridge 32 is retracted to an amount no greater than at least approximately the exterior diameter of upper portion 22. This again is the condition illustrated in FIG. 2c. Thereafter, the anchor is readily withdrawn from hole 36 so as to leave a clean hole that, if desired, may be filled and thus effectively removed from existence by the insertion therein of the material of matrix 38 or otherwise.

As specifically illustrated in FIGS. 1d and 2c–2d, plug 40 is internally bored and threaded so as to permit the coupling thereto of a variety of implements for effecting removal of the plug. Desirably, the size and pitch of the threads within the bore of plug 40 are standard so that a conventional bolt or screw may be threaded thereinto and pulled upon for the purpose of removing the plug. Alternatively, other coupling means, such as a bayonet connection, might be formed within the bore that coaxially extends through plug 40, so as to permit engagement with a mating connecting element on a related tool.

Figure 2:
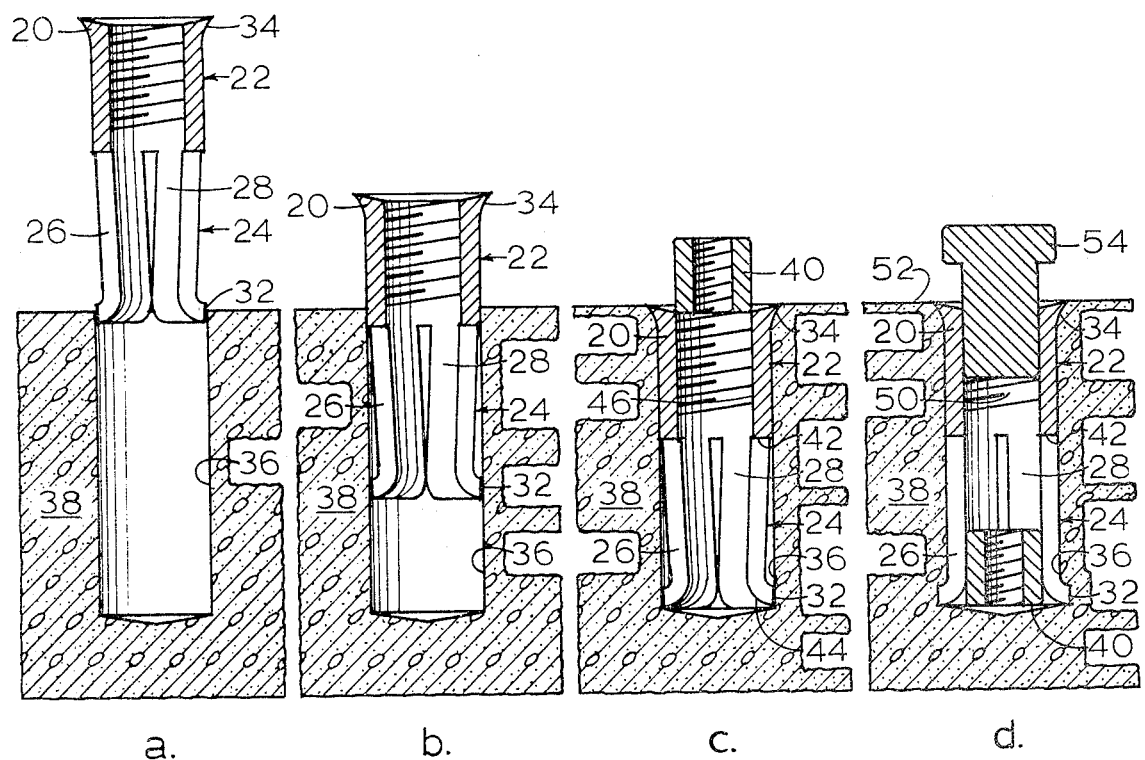
FIGS. 2a through 2d are fragmentary cross-sectional views representing implementation of that anchor.

As specifically illustrated in FIGS. 1 and 2, tube 20 is internally threaded within upper portion 22 as at 50 so as to allow the subsequent securement within tube 20 of a bolt or screw which holds down (or up or sideways) an element to be secured by the anchor. Alternatively, the longitudinal extent of upper portion 22 of tube 20 may be such as to remain in a position projecting outwardly from the upper surface 52 of matrix 38 after installation of the anchor into a position as shown in FIG. 2c. In that case, of course, it may be the exterior wall of upper portion 22 which is threaded to receive a fastening device. Still further in the alternative, other known means may be employed to couple a fastener to upper portion 22. For illustration, FIG. 2d illustrates the use of an externally threaded fastener 54.

In connection with the use of internal threads as at 50, one additional alternative for plug 40 is to have its laterally external surface threaded matably, so that plug 40 may be driven downwardly within segments 28 by means of rotational movement. To that end, of course, plug 40 may be longer and the coaxial internal bore within plug 40 would be provided with a suitable socket formation or the like to permit its axial turning to drive it downwardly on threads 50.

Figure 3:
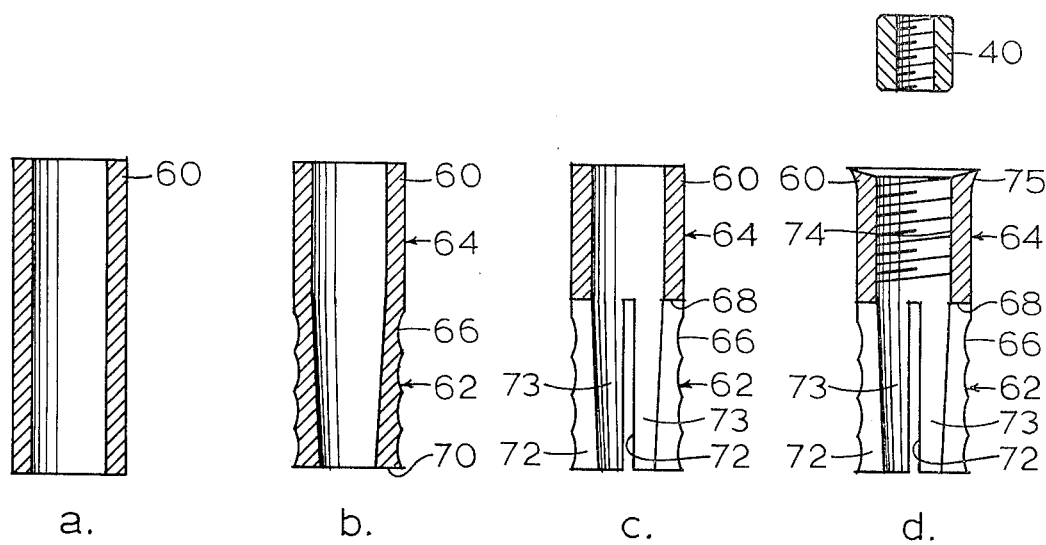
FIGS. 3a through 3d are cross-sectional views depicting successive steps in the manufacture of an alternative form of an anchor.
Figure 4:
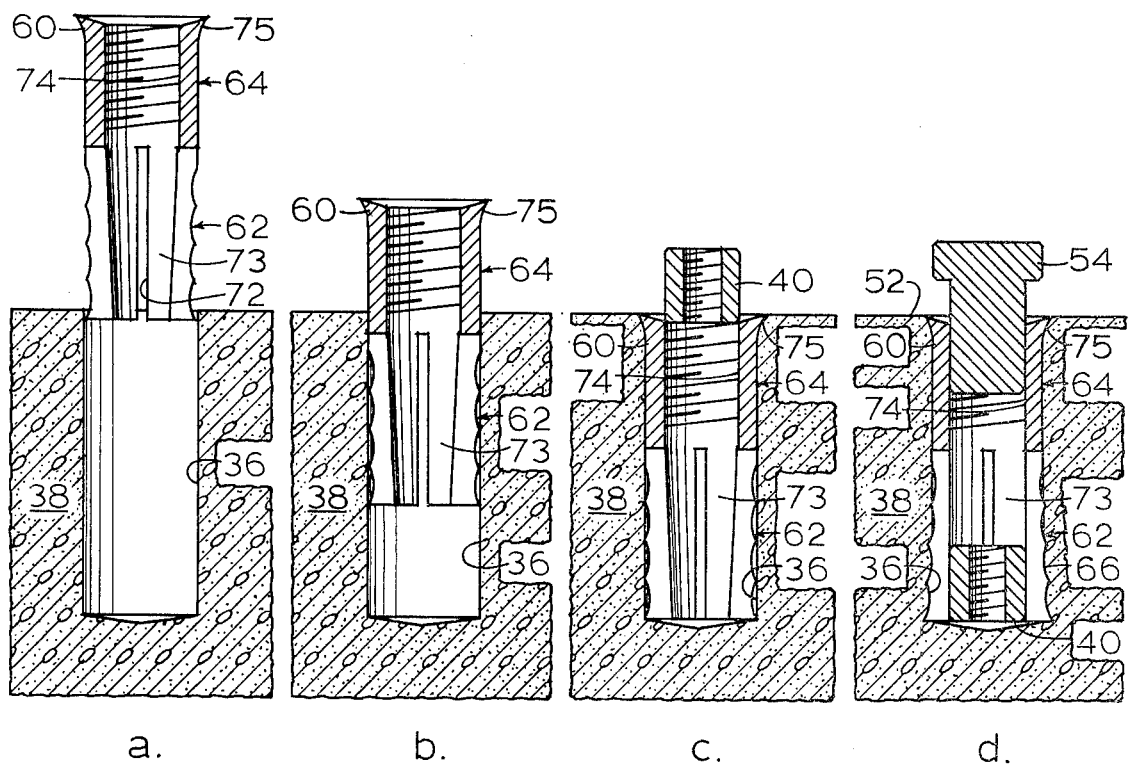
FIGS. 4a through 4d are fragmentary cross-sectional views representing implementation of that alternative anchor.

A second species is illustrated in FIGS. 3 and 4. Once again, the manufacture begins with the formation of a tube 60 as shown in FIG. 3a and formed of a material which at least initially is mallable. Next, a lower portion 62, below an upper portion 64, is thread rolled over a mandrel so as to form a series of corrugations 66 as shown in FIG. 3b. Thread rolling is, in itself, a known technique for impressing threads or corrugations into the external surface of a cylindrical object. If desired, those corrugations may be so formed as to exhibit a pitch that becomes progressively larger from the junction 68, between upper portion 64 and lower portion 62, to the lower end 70 of tube 60. As a result of that increase in pitch of the corrugations progressively in a downward direction, and of the mallability of the material, the thickness of the wall of lower portion 62 more easily may be caused to increase progressively from junction 68 to lower end 70. In any case, it is preferred that the interior wall of portion 62 assumes a decrease in diameter progressively from junction 68 to lower end 70. Next, a plurality of slots 72 are cut longitudinally into the wall of lower portion 62 as shown in FIG. 3c, so as to form a circumferentially-spaced series of segments 73. Further, the internal bore of upper portion 64 is threaded as indicated at 74 in FIG. 3d. Completing the initial formation, the upper end of portion 64 is formed into a flare 75 in a manner and for the purpose already described in connection with the embodiment of FIGS. 1 and 2.

As now progressively illustrated in FIGS. 4a-c, the fastener again is suitable for disposition within hole 36 formed into matrix 38. Also as before, plug 40 is receivable within upper portion 64 of tube 60 and has a diameter approximately the same as that at the upper end of the internal bore within lower portion 62. Upon impacting plug 40 to drive it downwardly from its initial location within upper portion 64 to a position within segments 73, the wall of lower portion 62 is expanded outwardly so that the outward-facing ridges of corrugations 66 are driven laterally outwardly into firm engagement with the wall of hole 36 in matrix 38. Again, plug 40 includes a threaded internal bore or other coupling arrangement to permit its engagement by a suitable tool at a subsequent time. This enables withdrawal of plug 40 upwardly and thereby results in the resilient collapse or contraction of sidewall segments 73 of lower portion 62 to assume the initial conformation as represented in FIGS. 3d and 4a-c. The final result is that of having the entire anchor removed from hole 36, leaving that hole in a clean condition.

The thread rolling process employed in connection with the subject matter depicted in FIGS. 3 and 4 for creating corrugations 66 and the tapered bore is sufficiently versatile as to permit the formation of those corrugations in some materials without any necessity for subsequent heat treating. With the use of other materials such as most steels, however, it may be desirable to include a step of subsequent heat treating after all threading, corrugation formation and thickness deformation have been completed. Of course, heat treatment adds the temper desired for resilience.

Figure 5:
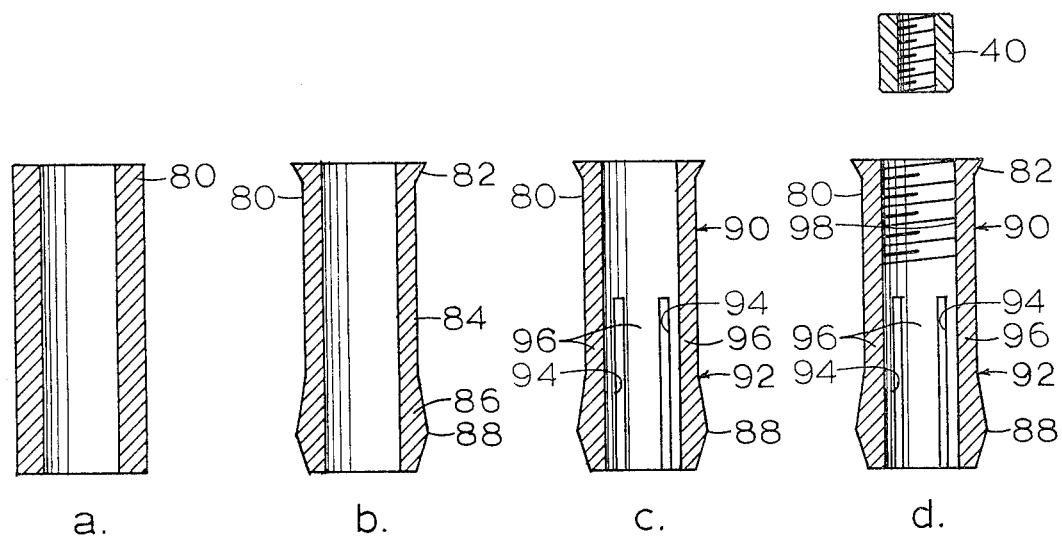
FIGS. 5a through 5d are cross-sectional views illustrating successive steps in the manufacture of a still further version of an anchor.
Figure 6:
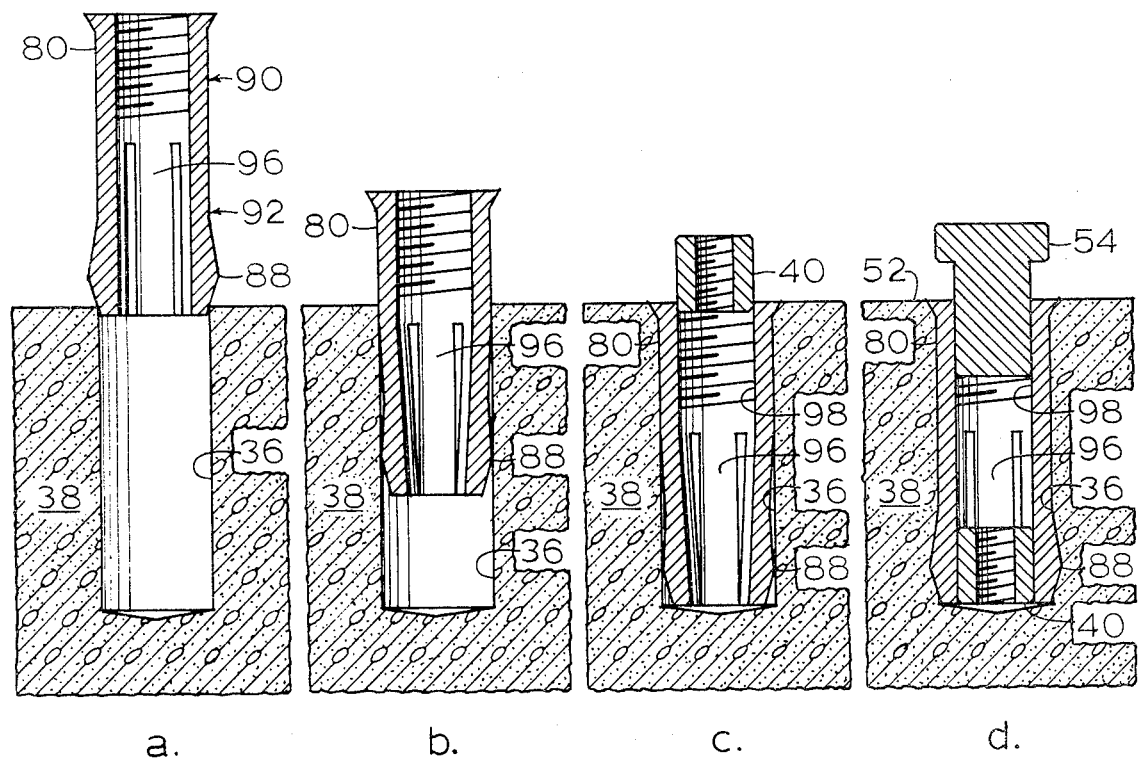
FIGS. 6a through 6d are fragmentary cross-sectional views representing implementation of that further version.

A still further and presently preferred embodiment is shown in FIGS. 5 and 6. The process of manufacture again begins with a section of tubular stock 80 as shown in FIG. 5a. Tube 80 is then machined, as on a lathe, or formed by means of a punching operation, so as to accomplish a shaping operation which results in a conformation as shown in FIG. 5d. This conformation exhibits an outwardly-directed flare 82 at the upper end of tube 80 which merges into a central neck portion 84 that continues downwardly unitl merging into a laterally-enlarged portion 86 that defines an outwardly facing ridge 88 near the bottom of tube 80. Once again, tube 80 is defined for purposes of discussion as having an upper portion 90 and a lower portion 92. As indicated in FIG. 5c, a series of circumferentially-spaced slots 94 are formed into lower portion 92 so as to define a series of segments 96.

In this case, it will be observed that lower portion 92 again increases in thickness in a downward direction, having a diameter which changes in that direction. In this particular version, however, it is the exterior diameter of lower portion 92 that changes in diameter so as to increase in the downward direction and thus result in the ultimate definition of ridge 88. Also as before, the interior bore of upper portion 90 is illustrated as being threaded as at 98, and tube 80 in itself is associated with a rigid plug 40 of the same kind as herebefore discussed and as shown in FIG. 5d. With tube 80 being composed of an initially machinable or otherwise formable metal, for example, the entire assembly of the anchor as shown in FIG. 5d may then, if necessary, be subjected to heat treatment as above described in order to insure that segments 96 exhibit resilience to lateral deflection.

In this case, ridge 88 has an external diameter that is larger than that of hole 36 (FIG. 6) in which it is to be inserted. The resiliency of segments 96 is relied upon to permit tube 80 to be inserted within hole 36 in the first place. That is, tube 80 is first positioned as shown in FIG. 6a and then moved into hole 36 as shown in 6b with an inward contraction of ridge 88 as well as of segments 96 which carry that ridge. The anchor of tube 80 as modified is then placed fully within the hole as illustrated in FIG. 6c. At that point, rigid plug 40 is inserted and then driven downwardly as previously described with respect to the earlier embodiments. Upon that action, segments 96 are driven laterally and radially apart so as to result in the ultimate firm installation of the anchor of tube 80 within hole 36 as shown in FIG. 6d. As before, a fastener 54 may then be engaged with the anchor of tube 80 either in the manner specifically illustrated in FIG. 6d or otherwise as discussed hereinabove.

Again once more, removal of the anchor formed of tube 80 requires only the engagement by an external tool with plug 40 so as to permit the withdrawal of plug 40 from within the interior bore of portions 90 and 92. That permits resilient contraction of segments 96 toward one another so as to diminish the diameter of ridge 88 and thus permit the entire anchor itself to be cleanly withdrawn from hole 36.

As will be seen, the ultimate anchor, in all species, is rather simple of manufacture. Moreover, it is exceedingly easy to install. More important, it is just as easy to remove. The result of its removal is the leaving of an essentially undamaged hole that may be easily erased by grouting or filling.

The specific approaches herein embodied have featured the installation of the preformed anchor assembly into a predrilled hole. That is not necessary. In one alternative, the completely preformed anchor may initially be cast into matrix 38 as part of initial construction. Nevertheless, an anchor of any of the kinds or types described may subsequently be removed, when desired, by means of the withdrawal of plug 40 so as to allow contraction fo the resilient segments and thereby permit upward movement of the body of the anchor out of the hole in which it was disposed.

Reference has repeatedly been made to the use of metallic materials for the anchor and the possible need for heat treatment in connection with achieving the necessary resilience of the segments formed into the lower portion of the anchor. It is to be recognized that the development of modern materials may enable the aims to be achieved by use of other than metals for the formation of the anchor. Particularly in the case of using other materials, it may be possible to achieve the necessary shaping of the anchor without any necessity for additional treatment in order also to have the benefit of the desired resiliency of the segments.

In connection with the three different specific embodiments, various cutting, machining and tool and die operations have been expressly described. Whether the material of the anchor is a metal or a non-metal, it is contemplated that these operations may be interchanged at least in part and that other techniques of material formation may be employed. For example, selection of an appropriate material may permit casting of the anchor itself.

In all cases, plug 40 has been shown and described as having a uniform external diameter. For all of the versions illustrated, this appears to be desirable for the purpose of achieving both the initial wedging action that expands the segments so as to lock the anchor firmly in place and also enabling removal of the rigid plug so as to permit subsequent withdrawal of the anchor from the substrate. That is, the uniform external plug diameter is for the purpose of enabling both its implanting for the purpose of seating the anchor and its subsequent withdrawal so as to permit removal of the anchor. It is contemplated, nevertheless, that other cooperative conformations of the exterior of plug 40 and the interior of lower portion 92 of the anchor may be devised to enable the achievement of this result. Any longitudinal taper or other conformation which is placed upon the exterior of plug 40 must be such as to enable its subsequent withdrawal from its position within the body of the anchor tube that caused the locking relationship to be maintained between ridge 88 and the wall of the hole within which the anchor was placed.

While particular embodiments of the invention have been shown and described, and several modifications and alternatives have been suggested, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A removable anchor assembly comprising:
   an elongated hollow tube having integral upper and lower portions with at least the lower portion exhibiting resilience to lateral deflection of segments of the walls thereof and the upper portion having means for attaching a separate member;
   a diameter of said lower portion normally changing progressively from the junction with said upper portion to the lower end of said lower portion, and said upper portion having predetermined internal and external diameters;
   means defining a plurality of successive circumferentially-spaced longitudinal slots in the wall of said lower portion that define said segments;
   means defining at least one lateral facing ridge on the external surface of said lower portion, said ridge having a normal diameter related to the external diameter of said upper portion;
   a rigid plug having a smooth exterior wall of a diameter to be movable through said upper portion and functionally the same as the interior diameter of said lower portion at said junction, said plug having a length less than the length of said lower portion and being insertable within said lower portion to wedge the walls thereof outwardly and expand the diameter of said ridge to an amount greater than said predetermined external diameter;
   and coupling means included within said plug for permitting engagement therewith to enable withdrawal of said plug from out of said lower portion and consequent contraction of the diameter of said ridge to an amount no greater than approximately the external diameter of said upper portion.

2. A removable anchor assembly comprising:
   an elongated hollow tube having integral upper and lower portions with at least the lower portion exhibiting resilience to lateral deflection of segments of the walls thereof and the upper portion having means for attaching a separate member;
   the interior diameter of said lower portion normally decreasing progressively from the junction with said upper portion to the lower end of said lower portion, and said upper portion having predetermined internal and external diameters;
   means defining a plurality of successive circumferentially-spaced longitudinal slots in the wall of said lower portion that define said segments;
   means defining at least one laterally facing ridge on the external surface of said lower portion, said ridge having a normal diameter related to the external diameter of said upper portion;
   a rigid plug having a smooth exterior wall of a diameter to be movable through said upper portion and functionally the same as the interior diameter of said lower portion at said junction, said plug having a length less than the length of said lower portion and being insertable within said lower portion to wedge the walls thereof outwardly and expand the diameter of said ridge to an amount greater than said predetermined external diameter;
   and coupling means included within said plug for permitting engagement therewith to enable withdrawal of said plug from out of said lower portion and consequent contraction of the diameter of said ridge to an amount no greater than approximately the external diameter of said upper portion.

3. A removable anchor assembly comprising:
   an elongated hollow tube having integral upper and lower portions with at least the lower portion exhibiting resilience to lateral deflection of segments of the walls thereof and the upper portion having means for attaching a separate member;
   the exterior diameter of said lower portion normally increasing in diameter progressively in the region between the junction with said upper portion to the lower end of said lower portion, and said upper portion having predetermined internal and external diameters;

means defining a plurality of successive circumferentially-spaced longitudinal slots in the wall of said lower portion that define said segments;

means included in said region defining at least one laterally facing ridge on the external surface of said lower portion, said ridge having a normal diameter greater than the external diameter of said upper portion;

a rigid plug having a smooth exterior wall of a diameter to be movable through said upper portion and functionally the same as the interior diameter of said lower portion at said junction, said plug having a length less than the length of said lower portion and being insertable within said lower portion to wedge the walls thereof outwardly and expand the diameter of said ridge to an amount greater than said predetermined external diameter;

and coupling means included within said plug for permitting engagement therewith to enable withdrawal of said plug from out of said lower portion and consequent contraction of the diameter of said ridge to an amount no greater than approximately the external diameter of said upper portion.

4. An assembly as defined in claims 1, 2 or 3 in which said upper portion is internally threaded to accept receipt of said separate member.

5. An assembly as defined in claims 1, 2 or 3 in which said coupling means is in the form of an internally-threaded bore within said plug and coaxial with said tube.

6. An assembly as defined in claims 1 or 2 in which, with said plug removed from a position within said lower portion, each segment of the wall of said lower portion, between respective successive ones of said slots, is tapered downwardly and inwardly to a lower terminal portion which is flanged sharply outwardly to define a respective portion of said ridge.

7. An assembly as defined in claims 1 or 2 in which, in definition of said ridge, said external surface of said lower portion is formed into a longitudinal succession of corrugations.

8. An assembly as defined in claim 7 in which the thickness of the wall of said lower portion progressively increases from said junction to the lower end of said lower portion.

9. An assembly as defined in claim 8 in which said thickness increase is formed in consequence of forming said corrugations.

10. An assembly as defined in claim 1 in which the diameter of said ridge normally is greater than that of said predetermined external diameter.

11. An assembly as defined in claims 1 or 3 in which the normally internal diameter of said lower portion is essentially the same as said predetermined internal diameter, and in which said ridge normally projects laterally outward to a greater extent than said predetermined external diameter.

12. An assembly as defined in claims 1, 2 or 3 in which the lateral thickness of the wall of said lower portion effectively increases progressively in a region between said junction and the lower end of said lower portion.

13. A removable anchor assembly comprising:

an elongated hollow tube having integral upper and lower portions with at least the lower portion exhibiting resilience to lateral deflection of segments of the walls thereof and the upper portion having means for attaching a separate member;

a diameter of said lower portion normally changing progressively from the junction with said upper portion to the lower end of said lower portion, and said upper portion having predetermined internal and external diameters;

means defining a plurality of successive circumferentially-spaced longitudinal slots in the wall of said lower portion that define said segments;

means defining at least one laterally facing ridge on the external surface of said lower portion, said ridge having a normal diameter related to the external diameter of said upper portion;

a rigid plug having a smooth exterior wall of a diameter to be movable through said upper portion and functionally the same as the interior diameter of said lower portion at said junction, said plug having a length less than the length of said lower portion and being insertable within said lower portion to wedge the walls thereof outwardly and expand the diameter of said ridge to an amount greater than said predetermined external diameter;

and coupling means included within said plug for permitting engagement therewith to enable withdrawal of said plug from out of said lower portion and consequent contraction of the diameter of said ridge to an amount no greater than approximately the external diameter of said upper portion.

14. An assembly as defined in claim 13 in which the diameter of said ridge normally is greater than that of said predetermined external diameter but in which deflection of said segments inwardly permits insertion of said tube within an opening and subsequent insertion of said rigid plug enforces expansion of said diameter of said ridge to an amount greater than said predetermined external diameter.

15. Apparatus as defined in claim 13 in which the exterior diameter of said plug is uniform.

16. Apparatus as defined in claim 13 in which the laterally external configuration of said plug, relative to the interior configuration of said lower portion, is shaped to enable insertion within or withdrawal from said lower portion of said plug.

* * * * *